(No Model.)
T. H. HICKS.
ELECTRO MEDICAL INDUCTION COIL.
No. 263,700. Patented Sept. 5, 1882.
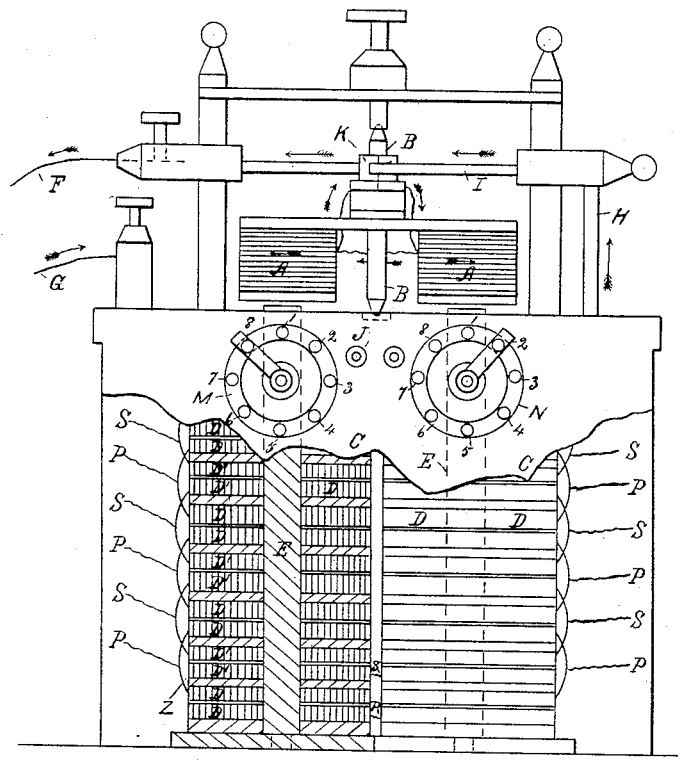
Fig.1.
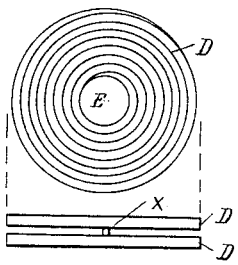
Fig.2.
Fig.3.
Witnesses.
A. Edmunds
Carl Hayden
Inventor.
Tho's H. Hicks
By P. J. Edmunds
Attorney

UNITED STATES PATENT OFFICE.

THOMAS H. HICKS, OF LONDON, ONTARIO, CANADA.

ELECTRO-MEDICAL INDUCTION-COIL.

SPECIFICATION forming part of Letters Patent No. 263,700, dated September 5, 1882.

Application filed April 20, 1882. (No model.) Patented in Canada September 23, 1880, No. 11,802.

*To all whom it may concern:*

Be it known that I, THOMAS HAMMILL HICKS, a subject of the Queen of Great Britain, residing at the city of London, in the Province of Ontario, Canada, physician, have invented certain new and useful Improvements on Electro-Medical Induction-Coils, (for which I have obtained a patent in Canada, No. 11,802, bearing date September 23, 1880,) of which the following is a specification.

My invention relates to that class of electro-magnetic induction-coils which is used for electro-medical purposes; and it consists of a combined primary and secondary electro-magnetic induction-coil for obtaining the currents of electricity to apply as a physiological and therapeutic agent.

In the accompanying drawings, which illustrate my invention and form a part of this specification, Figure 1 is a side elevation, partly in section, showing my invention. Fig. 2 is a plan of a disk, and Fig. 3 is an edge or side view of the same.

My invention consists in forming an electro-magnet, C C, of a number of disks, D D'. Said disks are shown in accompanying drawings, and are constructed of flat insulated copper wire, although round wire can be used; but it is more difficult to wind. Each pair of disks D D' is connected in the center by a metallic strip, X, as shown in Fig. 3, so as to have the terminal wires of each pair on the periphery or outside of the coil. Having constructed the desired number of said disks D D', they are placed around the soft iron-rods E E, and are connected as follows: Every alternate pair of disks D D is connected together so as to form the primary circuit for the galvanic current from the battery to pass through both the upper (or a revolving) and lower (or stationary) electro-magnet; and the other half of the disks D D', which alternate the primary disks, D D, are connected together to receive the induced currents from the primary disks, D D, and soft-iron core E whenever contact is broken by the upper electro-magnet, A, revolving. The disks D and disks D' are separated by a thin non-conducting body, Z.

This electro-medical motor is put into motion by any desired galvanic current and the operating currents obtained as follows, viz: The wires F and G shown in Fig. 1 are connected to a galvanic battery. This allows the electricity to run through every alternate disk of the lower electro-magnet and through wire H and spring I. At this point it enters the upper or a revolving electro-magnet, A, and travels in the direction of the arrows. During the travel of the electricity, as described, both electro-magnets A and C have become polarized, and when the poles of A and C are opposite each other the poles of A are changed by the commutator K, so as to be like poles with C, thereby causing repulsion between A and C, causing the electro-magnet A to revolve; but when they are at right angles to each other both attraction and repulsion are exerting their forces to complete a half-revolution, and at each half-revolution—*i. e.*, when the poles are opposite each other—the current in the revolving electro-magnet A is reversed by the commutator K. This reverses the poles in the upper magnet, A, again, so that at each half-revolution the poles in the upper revolving electro-magnet, A, are reversed, which causes it to revolve at a very high speed, and it is in this way that the current is interrupted to produce both primary and secondary currents in the lower electro-magnet, C, for electro-medical purposes.

Thus far we have seen how the electro-medical motor is put in motion, and I will next describe the manner of collecting both the primary and secondary currents of electricity. Commencing at the first disk D in the primary circuit, I carry a branch wire, P, and connect the same to a metallic button, J, and in like manner a branch wire, P, is carried from each pair of primary disks, D D, and attached to a circle of like buttons (marked M) in such a way that when the switch L is turned around over the buttons M the strength of either one, two, three, or any desired number of disks D D can be thrown into the circuit. The circle of buttons M will all be positive and the button J negative. The buttons M therefore represent degrees of strength. The secondary branch wires, S, will be connected to another circle of similar metallic buttons (marked N) in like manner, and will therefore need no description. By this combination of disks D D', I can obtain either a primary or secondary current of any desired strength and an induced current which is very low in tension and possessing a strong electrolytic or decomposing power. This electrolytic power of the induced or secondary current is produced by the induction-disks D' D' being in contact with the soft-iron core E, and also between the primary disks, D D.

In all ordinary electric medical induction-coils it is the tension only that is varied by a sliding metallic cylinder; but in this it is the number of disks in use that alters the electric current, and a current of electricity, to be capable of removing disease, must contain a definite proportion of tension for moving muscular fiber and an electrolytic power for decomposition.

In place of using a revolving electro-magnet A, as described, the currents can be interrupted by an ordinary vibrating spring.

I make no claim to the revolving electro-magnet A or to the metallic circles of buttons M N, as any of the well-known appliances may be used for interrupting the galvanic current and collecting the primary or secondary currents thus produced. I have therefore only referred to the revolving electro-magnet A and circles of buttons M N for the purpose of describing the operation of the said primary or secondary disks, D D'.

Having thus described my invention, I claim—

The combination of primary disks, D, with the secondary disks, D', non-conducting disks Z, metallic strip X, and branch wires P and S, constructed substantially as specified.

THOMAS HAMMILL HICKS.

Witnesses:
P. J. EDMUNDS,
A. EDMUNDS.